United States Patent [19]
Wang

[11] Patent Number: 5,796,796
[45] Date of Patent: Aug. 18, 1998

[54] POINTER ADJUSTMENT JITTER CANCELLATION PROCESSOR UTILIZING PHASE HOPPING AND PHASE LEAKING TECHNIQUES

[75] Inventor: Bor-Min Wang, Taichung, Taiwan

[73] Assignee: Industrial Technology Research Institute, Hsinchu, Taiwan

[21] Appl. No.: 584,196

[22] Filed: Jan. 11, 1996

[51] Int. Cl.$^6$ .............................. H04L 7/00; H04L 25/36; H04L 25/40
[52] U.S. Cl. ........................................ 375/372; 370/516
[58] Field of Search .................... 375/372, 363, 375/371; 370/516, 506, 505, 907

[56] References Cited

U.S. PATENT DOCUMENTS

| | | |
|---|---|---|
| 5,052,025 | 9/1991 | Duff et al. ................................ 375/262 |
| 5,268,935 | 12/1993 | Mediavilla et al. ..................... 375/372 |
| 5,337,334 | 8/1994 | Molloy ..................................... 375/372 |

OTHER PUBLICATIONS

Sari, Hikmet, et al., "Cancelation of Pointer Adjustment Jitter in SDH Networks" IEEE Transactions on Communications, vol. 42, No. 12, Dec., 1994.

*Primary Examiner*—Stephen Chin
*Assistant Examiner*—Betsy L. Deppe
*Attorney, Agent, or Firm*—Finnegan, Henderson, Farabow, Garrett & Dunner, L.L.P.

[57] ABSTRACT

A system for canceling network pointer adjustment jitters (PAJs). The system is equipped with an elastic buffer to receive, according to a write clock signal, and for temporarily storing a plurality of data bits in the buffer and a pointer interpreter for determining a pointer adjustment event (PAE) and a polarity of bit-stuffing from the data bits. The jitter-cancellation system includes a leaking rate control signal generator for generating a leaking rate control based on the PAE and a polarity signal based on the polarity of bit stuffing. The jitter-cancellation system further includes a phase hopping control device for applying the write clock signal, the leaking rate control signal and the polarity signal for performing a phase-hopping read clock adjustment to generate a read clock signal for controlling a bit-leaking from the elastic buffer such that the bit-leaking is controlled to release in a fraction of a phase step, i. e., a phase of $(2\pi/n)$ for each bit of the data.

11 Claims, 5 Drawing Sheets

POINTER ADJUSTMENT JITTER CANCELLATION PROCESSOR UTILIZING PHASE HOPPING AND PHASE LEAKING TECHNIQUES

BACKGROUND OF THE INVENTION

1. Field of the Invention

This invention relates generally to a system configuration and method for pointer adjustment jitter for network synchronization process. More particularly, this invention relates to improved method and apparatus for cancellation of pointer adjustment jitter by utilizing a phase hopping technique.

2. Description of the Prior Art

The timing jitters induced by pointer adjustments in an optical signal transmission system, such as a system applying a synchronous digital hierarchy (SDH) standard based on synchronous optical network (SONET) design framework, represent a serious technical problem. The intrinsic difficulties arise from the nature of the task because the low frequencies and the large phase jump, e.g., a 24-bit jump, in an STM-1 frame structure. The processes performed by a post stage phase lock (PLL) would not be sufficient to reduce the pointer adjustment jitter to an acceptable level even when a dynamic bit leaking rate buffer is used. If the jitters generated are not properly reduced and the adverse effects caused by the jitters are further propagated thus leading to buffer errors or data errors. An out of synchronization fault may occur thus causes a system failure and a termination of communication.

A synchronous frame structure for a multiplexed digital traffic with standard optical transmission signal interfaces are adopted by the International Consultative Committee for Telephone and Telegraph (CCITT) in 1988 for developing into a synchronous digital hierarchy (SDH) standard. The international SDH standards are rooted in Bellcore's original SONET framework which has a basic rate of 51.84 Mb/s and is referred to as synchronous transport level-1 (STS-1). An STS-1 frame comprises 810 bytes, i.e., 8 bits, representing an array of 9 rows and 90 columns. The order of transmission is row by row from left to right with a frame period of 125 micro seconds, i.e., 125 μs. The frame rate, i.e., 1/T, 8 KHz, is the byte rate of the basic telephone channel rate of transmission, i.e., 64 kb/s. In the international SDH standards, the basic frame rate is 155.52 Mb/s and is referred to as synchronous transport module level-1 (STM-1). An STM-1 frame includes 2430 bytes to represent an array of 9 rows of 270 columns. An STM-1 frame can be treated as three STS-1 frame concatenated byte by byte. The bytes contained in a frame typically contain 'line and section overhead' for identifying the number of rows and columns transmitted. An STM-1 signal, i.e., signals with a frame structure based on SDH standards, may also be employed for transmitting signals with lower frequencies from different type of networks. The phase and frequency differences between a transmitter and receiver are processed by a pointer adjustment mechanism, i.e., frame alignment process. With the use of this pointer adjustment mechanism, the SDH standards can also be employed in an existing plesiochronous networks for signal transmission. The pointer adjustment has also been applied to frame-align different STM-1 signals to form higher order SDH signals.

The pointer adjustment therefore enables the transmission and reception of signals formed with same frame structure over different networks of different phases and frequencies without requiring frame buffers when a multiplexer is used as interface. However, in performing this task of frame alignment, substantial jitters occur due to variations of network noises, timing differences when different clocks are used and other environment and equipment variations and noises. This jitter must be filtered and reduced to an acceptable level according to the CCITT standards.

A pointer is used to indicate the starting bit address of a frame, e.g., a STM-1 frame. When the signals are received by a signal receiver with a frequency offsets and phase variations from the clock of the receiver, pointer adjustments of appropriate signs are made to align the start bits. If the local STM-1 clock in a network node is lagging behind the clock of the synchronous payload sending the signals, a negative pointer adjustment is made every time the phase lag exceeds a predetermined threshold. A negative pointer adjustment within a frame indicates that the starting address of the payload is decremented by three bytes, i.e., 24 bits, and that three bytes are transported using a dedicated location in the section overhead (SOH) portion of the STM-1 frame. Conversely, if the local STM-1 clock is advancing in phase, a positive pointer adjustment is made every time the phase lead exceeds a threshold and the start address of the payload is incremented by three bytes with that three bytes of the payload envelope carrying dummy bits. The signals from payload are therefore 'floating' with respect to the local STM-1 frame and slips in one direction or the other depending on the polarity of the frequency difference between the two clocks.

Figure 1:
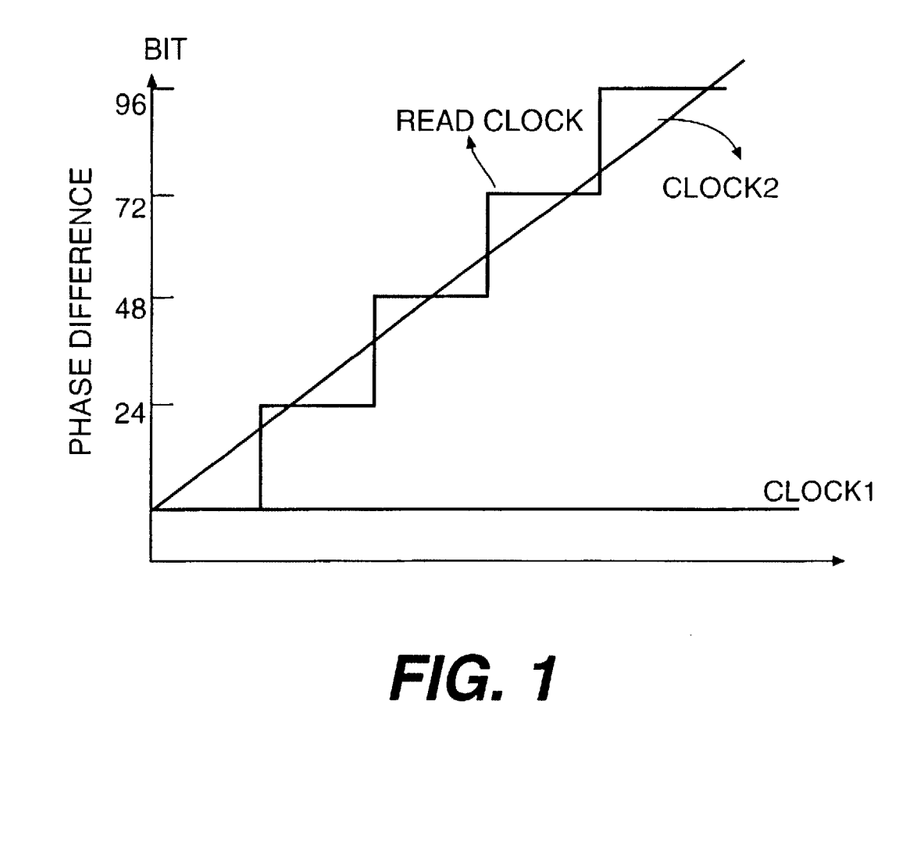
FIG. 1 shows the phase quantization effect of pointer adjustments on the phase of the transported tributary signals.

The effect of such 'phase quantization' by applying the pointer adjustment mechanism on the phase of the transported tributary signals when compared with the phase of an STM-1 clock is shown in FIG. 1. The phases as shown are measured in STM-1 clock phase where the tilted straight line represents the phase of the original signals transported. With a positive slope, the payload clock is advancing in phase with respect to the STM clock. The staircase-like function of 24 bits represents the phase of the transported signals extracted at the network terminating node when a pointer adjustment is applied. The phase slips which occur in a 24-bit steps as that shown in FIG. 1 cause unacceptable jitters and must be reduced. Due to the low frequency, it is very difficult to sufficiently reduce the pointer adjustment jitters by the use of phase lock loop (PLL) circuit because it would require a PLL of very narrow bandwidth which is almost impossible to attain by the use an analog circuit. Meanwhile, design of a digital PLL would require a digital oscillator which has a frequency several orders of magnitude larger than that of the STM-1 clock. The requirement of pointer adjustment jitter (PAJ) reduction thus becomes a major problem in signal transmission in an SDH/SONET network system.

In order to reduce pointer adjustment jitters, a desynchronizer circuit is used which generally includes two stages. The first stage is a circuit to spread the 24 bits into a one bit phase steps in a certain manner which often is referred to as 'bit leaking' or phase spreading circuit. The second stage is a conventional second order PLL which is used to filter the one bit steps received from the first stage. The bit leaking circuit can be a fixed or adaptive type of bit leaking. A leaking bit buffer is typically used to store the bits to be released over time. A fix rate bit leaking circuit has the difficulties that the leaking bit buffer often overflows when a degraded jitter condition occurs. In an adaptive bit leaking circuit, the speed of bit leaking is calculated based on the incoming pointer adjustment statistics. The phase difference between the read and write clocks of the buffer is filtered in a digital low-pass filter and the resulting signal is passed to a control circuit after the addition of some noise. The control circuit then activate the release of bit every time the input exceed a threshold. The adaptive bit leaking circuit has the technical difficulties that small jitter in normal operation mode and small static phase error in the degraded mode cannot be achieved simultaneously.

Sari et al disclose in an article entitled 'Cancellation of Pointer Adjustment Jitter in SDH Networks' (published in IEEE Transaction of Communication Vol 42, No. 12 December 1994), a jitter reduction technique by the use of a phase smoothing desynchronizer which applies a special sequence to modulate the pointer adjustment jitter into higher frequency and then reduce the jitter by a PLL circuit In a normal mode when the clock precision is better than $10^{-10}$, the jitter can be reduced to an acceptable amount. However, in a degraded mode, a less stable clock typically has a precision of few parts per million (ppm), a significant jitter peak still remains at the output of the PLL. As the published results show that the jitter increases with the frequency offset, in a worst case, the system when encountered with an offset of ±20 ppm, large amount of jitter cannot be prevented when this technique disclosed by Sari et al. is applied. In addition, each modulation sequence corresponds to a certain leakage rate. It is necessary to prepare many kinds of sequences for dynamic leaking rate design. This disadvantage increases the implementation cost and complexity. Furthermore, the number of sequences limits the flexibility of the leaking rate control.

Therefore, a need still exists in the art of signal transmission and network synchronization to provide a novel and improved jitter cancellation system for PAJ cancellation which is able overcome these difficulties and limitations.

SUMMARY OF THE PRESENT INVENTION

It is therefore an object of the present invention to provide a new pointer adjustment jitter (PAJ) canceling processor by employing improved and novel phase hopping and phase leaking techniques such that the aforementioned difficulties and limitations in the prior art can be overcome.

Specifically, it is an object of the present invention to provide a new pointer adjustment jitter (PAJ) canceling processor by employing improved and novel phase hopping and phase leaking techniques such that very high level of jitter cancellation can be achieved.

Another object of the present invention is to provide a new pointer adjustment jitter (PAJ) canceling processor by employing improved and novel phase hopping and phase leaking techniques such that the pointer adjustment jitter are modulated to high frequency which can be more conveniently processed.

Another object of the present invention is to provide a new pointer adjustment jitter (PAJ) canceling processor by employing improved and novel phase hopping and phase leaking techniques such that the a dynamic leaking algorithm can be easily implemented.

Another object of the present invention is to provide a new pointer adjustment jitter (PAJ) canceling processor by employing improved and novel phase hopping and phase leaking techniques such that the PAJ canceling processor can be implemented with simple system architecture with circuits which can be easily designed and implemented.

Briefly, in a preferred embodiment, the present invention includes an apparatus for canceling network pointer adjustment jitters (PAJs), having an elastic buffer to receive, according to a write clock signal, and for temporarily storing a plurality of data bits therein and a pointer interpreter for determining a pointer adjustment event (PAE) and a polarity of bit-stuffing from the data bits. The apparatus includes a leaking rate control signal generator for generating a leaking rate control based on the PAE and a polarity signal based on the polarity of bit stuffing. The apparatus further includes a phase hopping control device for applying the write clock signal, the leaking rate control signal and the polarity signal for performing a phase-hopping read clock adjustment to generate a read clock signal for controlling a bit-leaking from the elastic buffer whereby the bit-leaking is controlled to release in a fraction of a phase step of each bit of the data.

It is an advantage of the present invention that it provides a new pointer adjustment jitter (PAJ) canceling processor by employing improved and novel phase hopping and phase leaking techniques such that very high level of jitter cancellation can be achieved.

Another advantage of the present invention is that it provides a new pointer adjustment jitter (PAJ) canceling processor by employing improved and novel phase hopping and phase leaking techniques such that the pointer adjustment jitter are modulated to high frequency which can be more conveniently processed.

Another advantage of the present invention is that it provides a new pointer adjustment jitter (PAJ) canceling processor by employing improved and novel phase hopping and phase leaking techniques such that the a dynamic leaking algorithm can be easily implemented.

Another advantage of the present invention is that it provides a new pointer adjustment jitter (PAJ) canceling processor by employing improved and novel phase hopping and phase leaking techniques such that the PAJ canceling processor can be implemented with simple system architecture with circuits which can be easily designed and implemented.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 2:
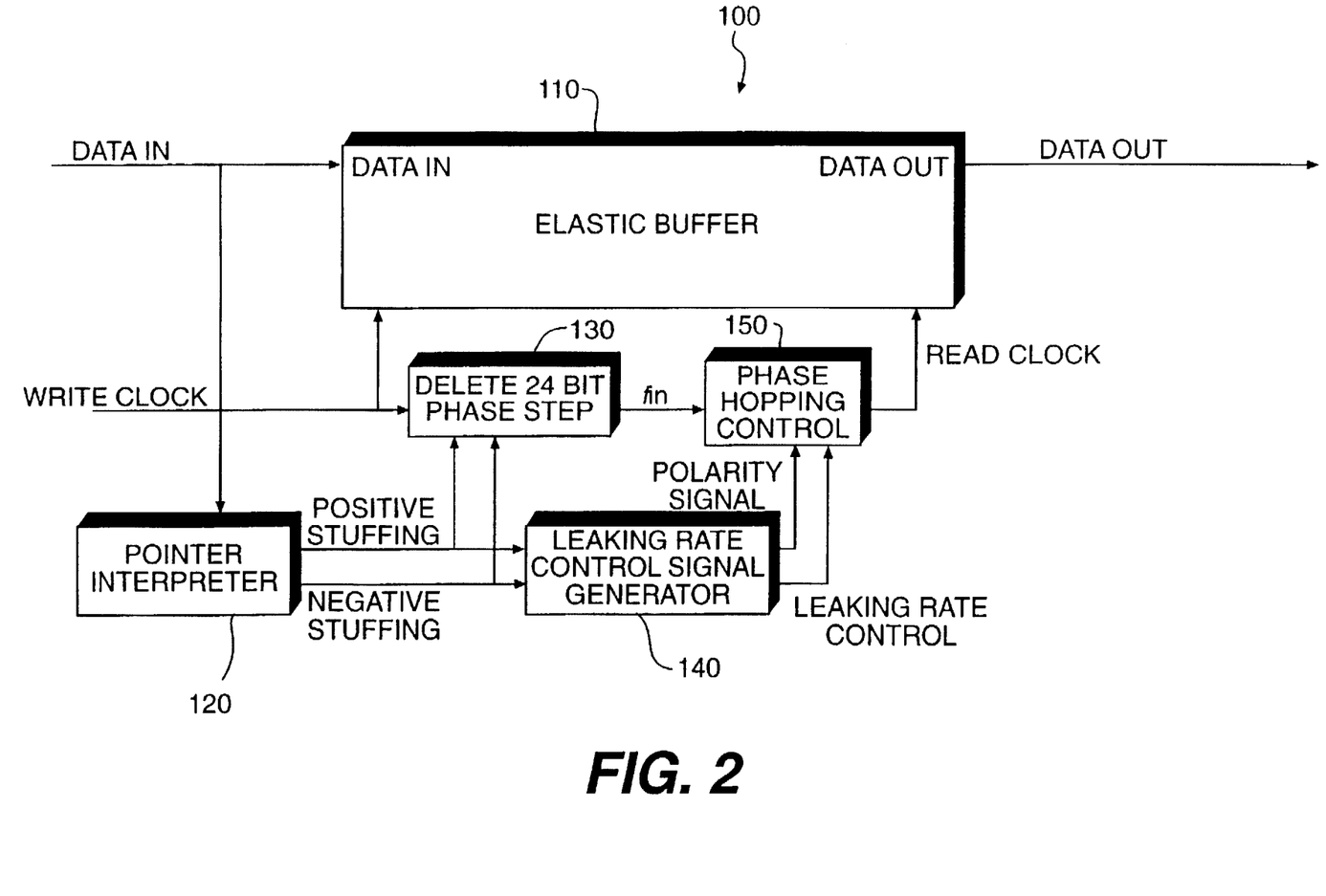
FIG. 2 shows a functional block diagram of a pointer adjustment jitter cancellation system of the present invention.

FIG. 2 is a functional block diagram of a pointer adjustment jitter (PAJ) cancellation system 100 of the present invention. The incoming data stream is first received and stored in an elastic buffer 110. The elastic buffer 110 is to allow adjustments to be made to cancel the phase noises and the frequency difference and between the write clock and the read clock A pointer interpreter 120 receives the input data and determines, from the overhead data block, if a pointer adjustment event (PAE) occurs and, in the case of a PAE occurs, if a positive or negative stuffing, i.e., the polarity of the bit-stuffing, is necessary to cancel the pointer adjustment jitters. An indication signal for the polarity of stuffing, i.e., a positive stuffing or a negative stuffing signal, is transmitted to a 24-bit phase step deletion circuit 130 and a leaking rate control signal generator (LRCSG) 140. The 24-bit phase step deletion circuit 130 suppresses a 24-bit phase step according to the positive or negative stuffing signal received from the pointer interpreter 120 such that the elastic buffer 110 is suppressed from responding to the read clock signals. In the mean time, a compensation signal $f_{in}$, which is a read clock signal with the read-clock pluses for reading the 24-bit deleted, is generated and sent to a phase hopping control circuit 150. The leaking rate control signal generator 140 also applies the frequency of a positive or a negative stuffing signal to generate a leaking rate clock signal. The leaking rate clock signal can be generated based on a fixed or dynamic algorithm. The leaking rate clock is generated as a function of the rate of occurrences of the pointer adjustment event (PAE). When the rate of occurrence of PAE is high, the leaking rate clock is correspondingly increased. The leaking rate control signal generator 140 also generates a polarity signal based on a positive or negative stuffing signal. The polarity signal is applied by the phase hopping control circuit 140 to increase or decrease the read clock rate depending on the polarity signal is a positive or negative signal respectively. The phase hopping control circuit 150 is adjusted to be in an accelerating or decelerating mode for controlling the phase hopping. The phase hopping control circuit 150 applies the compensated write clock signal fin, the polarity signal and the leaking rate clock control signal to generate a jitter cancellation read clock which is applied by the elastic buffer 110 to release the 24-bit pointer adjustment jitter in several segments under the control of the phase hopping control circuit 150 as further explained below.

Figure 3:
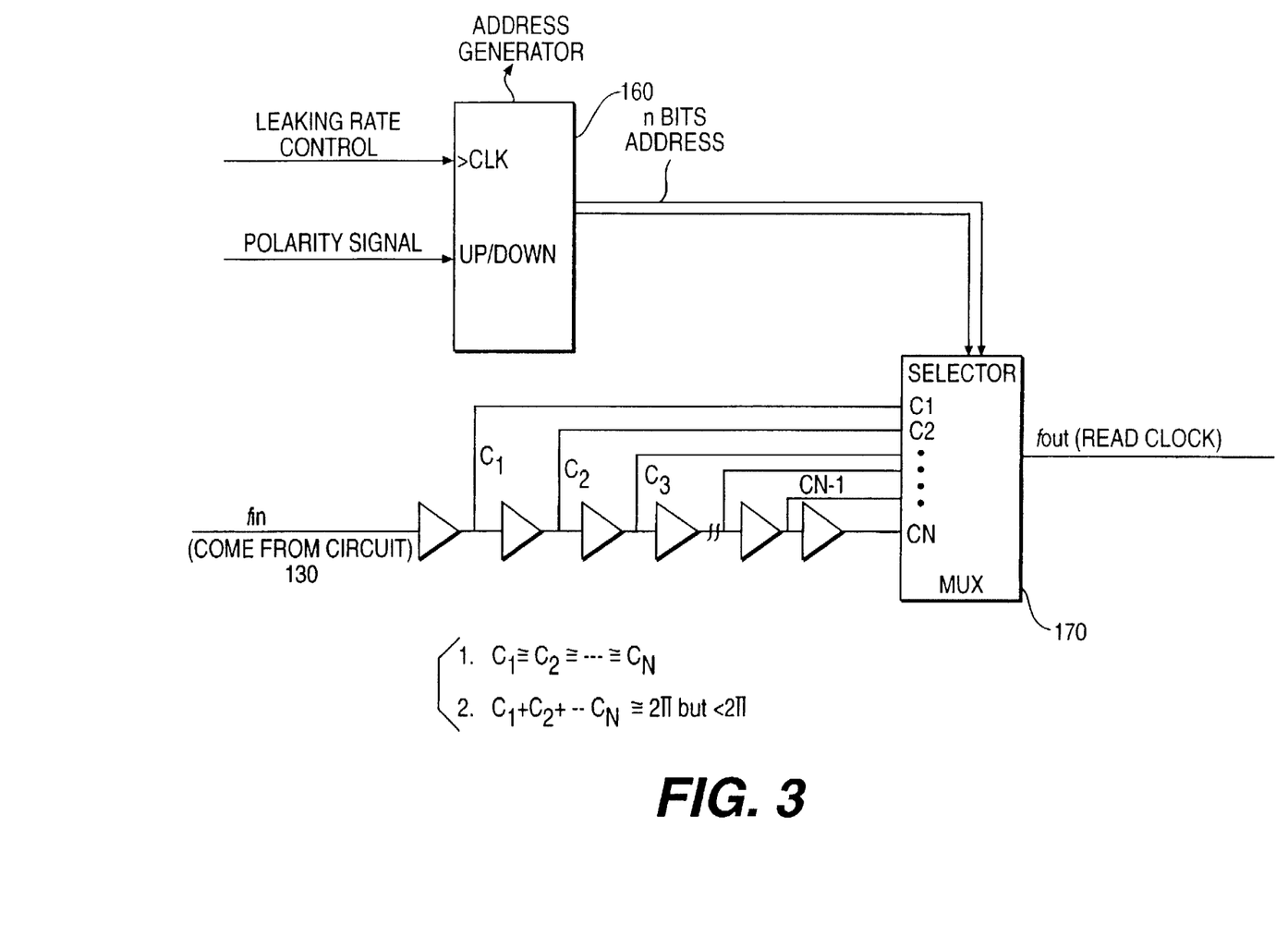
FIG. 3 shows a functional block diagram of a phase hopping controller of the present invention.

FIG. 3 is a functional block diagram for the phase hopping control circuit 150. The phase hopping control circuit 150 includes a address generator 160 which is an up-down counter. The address generator 160 includes a clock input port to receive the leaking rate control signal and an up-down input port to receive the polarity signal. The address generator 160 applies the leaking rate control signal and the polarity signal to generate a n-bit address to input to a selector input port on a multiplexer 170. The multiplexer 170 further receives a plurality of input signal, C1, C2, C3, . . . , Cn-1, and Cn, generated by a plurality of delay circuit 180-1, 180-2, 180-3, . . . , 180-n. These delay signals Ci, i=z1, 2, 3, . . . , n, are delay signals of the compensated write clock signal $f_n$ received from the 24-bit phase step deletion circuit 130. By the use of these delay circuit 180-i, i=1, 2, 3, . . . , n, each bit of the phase jump is divided into n fractions, e.g., n=32. By applying the technique of phase hopping, the 24 bits phase jumps are leaked fraction by fraction as further explained below.

Figure 4:
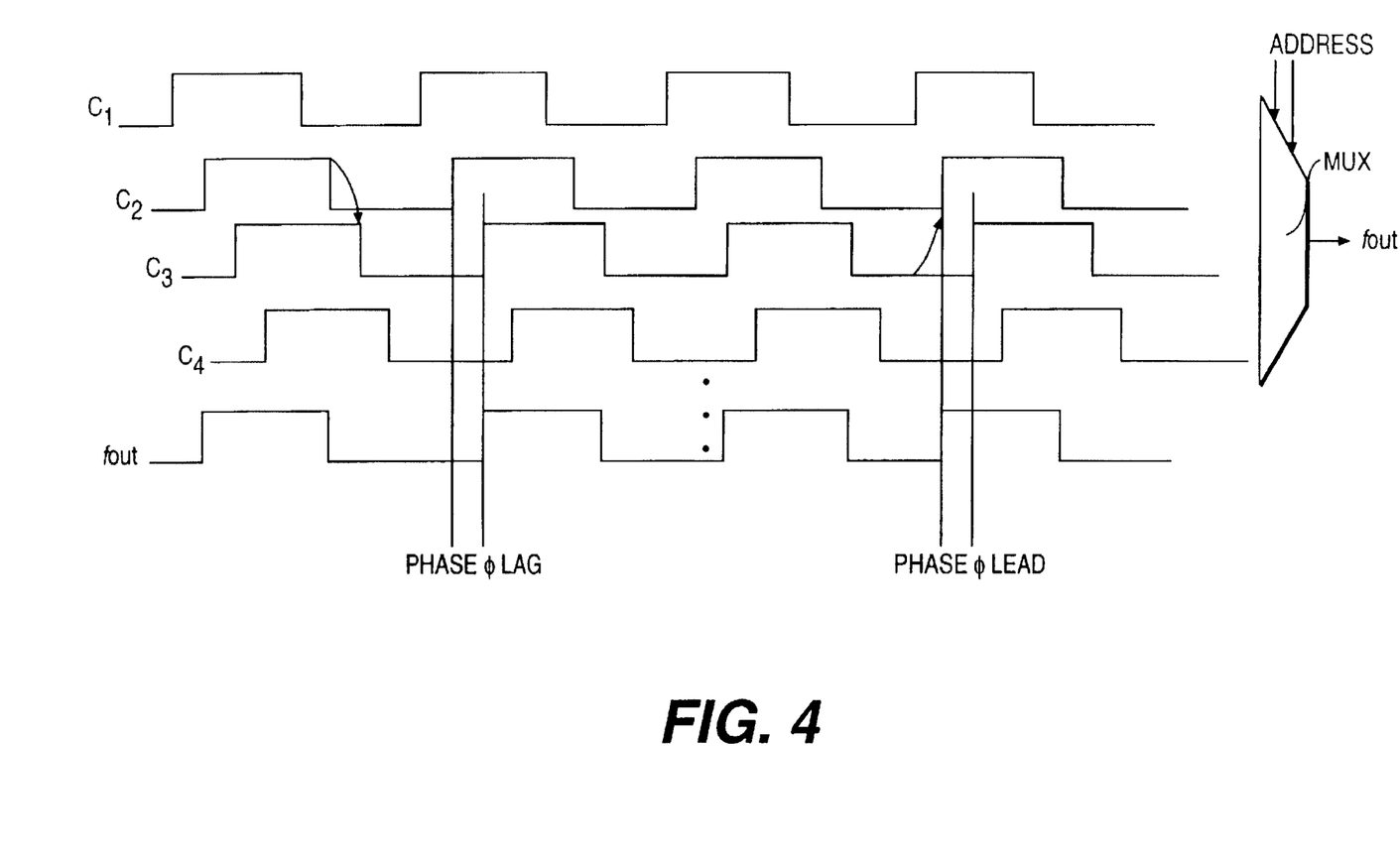
FIG. 4 is a clock timing diagram showing different phase clocks generated by different delay lines and the phase hopping function performed by the multiplexer of the phase hopping controller of FIG. 3.

FIG. 4 shows a timing diagram and the function performed by the multiplexer 170 which applies the delay signals Ci, i=1, n, the polarity signal and the leaking rate control signal to generate a phase-hopping read clock $f_{out}$. Assuming that, at time $T_{zero}$, the read clock signal $f_{out}$ is following clock signal C2. Then, at time T1, a phase lag function is to be performed through the input of a negative polarity signal. Instead of following the dock signal of C2, a phase hopping is carried out by applying the n-bit address generated by the address generator 160 to select the clock of C3. The output read clock is therefore delayed by (360°/N), with T as the period of the clock signal for a phase of 360° and n is the total number of delay circuits 180. With thirty-two delay circuits, the output clock is then delayed by one-thirty-second of a period. The output read clock $f_{out}$ is now following C3. Subsequently, when a phase lead function is to be performed up the reception of a positive polarity signal. The read clock $f_{out}$ is selected by the multiplexer 170 to follow C2 through the n-bit address generated by the address generator 170, i.e., the up-down counter, which decreases the address from three to two in order to actuate a phase lead. The output read clock $f_{out}$ is following C2 again which is leading C3 by a phase of (360°/n), e.g., (360°/32) when n=32.

The present invention thus discloses an apparatus 100 for canceling network pointer adjustment jitters (PAJs). The apparatus 100 having an elastic buffer 110 to receive, according to a write clock signal, and for temporarily storing a plurality of data bits therein. The apparatus 100 further has a pointer interpreter 120 for determining a pointer adjustment event (PAE) and a polarity of bit-stuffing from the data bits. The apparatus includes a leaking rate control signal generator 140 for generating a leaking rate control based on the PAE and a polarity signal based on the polarity of bit stuffing. The apparatus further includes a 24-bit phase-step deletion circuit 130 for receiving the write clock signal to generate a 24-bit phase-step suppression signal for inputting to the elastic buffer 110 and a compensated write clock signal for the phase hopping control circuit 150 whereby the apparatus is provided to implement on an existing network implemented with a 24-bit phase step signal to generate a read clock signal to control a bit-leaking from the elastic buffer 110. The apparatus further includes a phase hopping control device 150 for applying the write clock signal, the leaking rate control signal and the polarity signal for performing a phase-hopping read clock adjustment to generate a read clock signal for controlling a bit-leaking from the elastic buffer 110 whereby the bit-leaking is controlled to release in a fraction of a phase step of each bit of the data. The hopping control circuit 150 further includes an up-down counter 160 for receiving the leaking rate control signal and the polarity signal for generating an address. The hopping control circuit 150 further includes a plurality of delay circuits 180-i, i=1, 2, 3, . . . , n, for receiving the write clock signal for generating a plurality of phase hopping delay signals wherein each of the delay circuits is provided for generating a phase hopping delay signals of approximately equal phase delay, and wherein a sum of the phase delays of the plurality of delay circuits is approximately a total phase of 2π. The apparatus further includes a multiplexer 170 for receiving the phase hopping delay signals and the address from the up-down counter 160 to generate the read clock signal for controlling a data bit output from the elastic buffer 110.

Figure 5A:
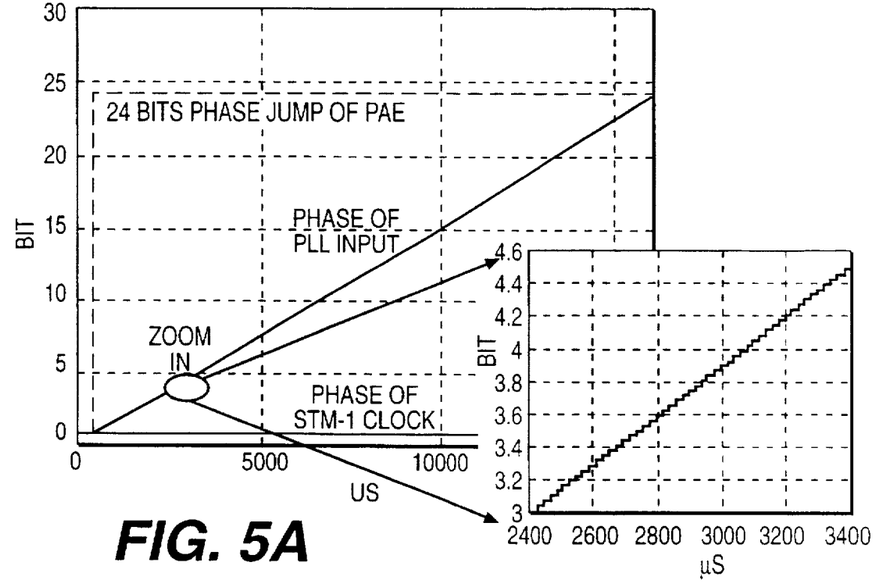
FIGS. 5A and 5B show the simulation results of the performance of the jitter cancellation in a communication system implementing the phase hopping circuits of the present invention.
Figure 5B:
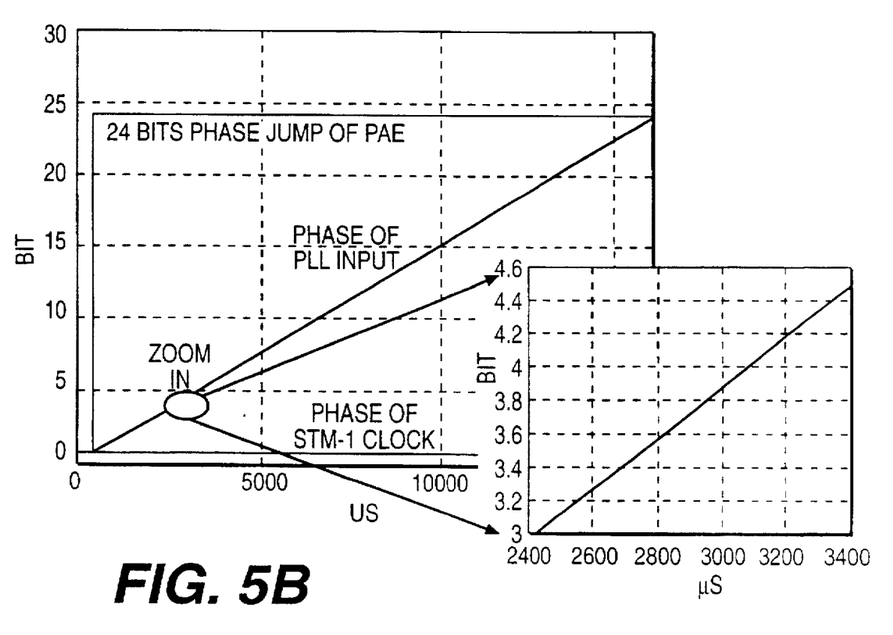

Instead of conventional bit leaking, a phase leaking technique and a circuit implementation are disclosed in this invention. For an address generator 170 which generates 5 bits of address, with 32 delay circuits, i. e., $n=32=2^5$, is implemented. The phase adjustment for the leaking of each bit is divided into thirty-two fractions. By the use of the phase hopping technique as described above, the pointer adjustment jitter is leaked fraction by fraction. The jitter magnitude is now reduced below 0.032 UI before the filtering of PLL. At the same time, the jitter is modulated into higher frequency for the benefit of the PLL filtering. FIG. 5A shows the phase steps with the application of the phase hopping operation. The jitter amplitude as shown is less than 0.032 UI and the jitter frequency is now modulated to several hundred times of the original frequency. FIG. 5B shows the output jitter of the PLL filter. The small jitters inputted to the PLL filter are almost totally removed and the output clock is nearly jitter free. FIGS. 5A and 5B are simulation results assuming a worst case of ±20 ppm frequency offset and a maximum pointer adjustment event (PAE) frequency of ±125 PAE/sec. The leaking rate is fixed as a constant and the PLL bandwidth is 20 Hz. The phase hopping technique can achieve satisfactory performance in the worst system condition even with the use of most basic leaking rate control. i.e., a static fixed leaking rate control. Reliable and excellent jitter cancellation is achieved without relying on the filtering of PLL even under worst system operation conditions. The jitter frequency is being modulated into few hundred times of original frequency whereby the design of the PLL can be much simplified. The phase hopping technique can be easily implemented with very simple and economic circuit devices. Simple dynamic leaking rate control can also be employed with simple circuit without requiring sophisticate and complex leaking rate schemes.

By employing the phase hopping technique of the present invention. under the worst situation that the point jitter event (PJE) occurs at a frequency of 125 Hz, since the leaking rate of every bit is now divided into 32 fractions, the bit leaking rate is now performed at a frequency of f=(125)(32)(24) Hz under this worst situation. With this bit leaking rate frequency. by the use of a static bit-leaking rate control, the worst jitter output is (1/32) unit interval (UI). Under the circumstances where further improvement of output jitter is required, a dynamic leaking rate control can be easily implemented by controlling the bit-leaking rate frequency with the use of a programmable divider. The bit leaking rate frequency is controlled as f/N where a denominator N is applied to adjust the bit leaking rate frequency and N is dependent on the time history of PJE occurrences. The read clock is thus dynamically controlled with a very simple circuit implementation by the use of a divider triggered by the occurrences of PJE. However. with the phase hopping techniques of the present invention. the use of a dynamic bit leaking rate control may not be necessary because the worst jitter is only (1/32) UI compared with a range of 0.5 to 3.0 UIs typically achievable by the use of a prior art pointer adjustment jitter (PAJ) cancellation circuit.

The present invention further discloses a method for canceling network pointer adjustment jitters (PAJs) on a network having an elastic buffer to receive. according to a write clock signal, and for temporarily storing a plurality of data bits therein and a pointer interpreter for determining a pointer adjustment event (PAE) and a polarity of bit-stuffing from the data bits. The method includes the steps of: (a) generating a leaking rate control signal by employing a leaking rate control signal generator based on the PAE and a polarity signal based on the polarity of bit stuffing; and (b) employing a phase hopping control device for applying the write clock signal, the leaking rate control signal and the polarity signal for performing a phase-hopping read clock adjustment to generate a read clock signal for controlling a bit-leaking from the elastic buffer whereby the bit-leaking is controlled to release in a fraction of a phase step of each bit of the data.

Therefore, the present invention provides a new pointer adjustment jitter (PAJ) canceling apparatus by employing improved and novel phase hopping and phase leaking techniques such that the difficulties and limitations in the prior art are overcome. Specifically, the new pointer adjustment jitter (PAJ) canceling apparatus which applies the phase hopping and phase leaking control circuit to achieve very high level of jitter cancellation. By the use of the phase hopping circuit. the pointer adjustment jitter are modulated to high frequency which can be more conveniently processed by subsequent PLL filter and the dynamic leaking algorithm can be easily implemented. Furthermore, the PAJ canceling apparatus can be implemented with simple system architecture with circuits which can be easily designed and implemented.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. An apparatus for canceling network pointer adjustment jitters (PAJs), having an elastic buffer to receive, according to a write clock signal, and for temporarily storing a plurality of data bits therein and a pointer interpreter for determining a pointer adjustment event (PAE) and a polarity of bit-stuffing from said data bits, said apparatus comprising:

a leaking rate control signal generator for generating a leaking rate control based on said PAE and a polarity signal based on said polarity of bit stuffing; and a phase hopping control device for applying said write clock signal, said leaking rate control signal and said polarity signal for performing a phase-hopping read clock adjustment to generate a read clock signal for controlling a bit-leaking from said elastic buffer whereby said bit-leaking is controlled to release in a fraction of a phase step of each bit of said data.

2. An apparatus for canceling network PAJs of claim 1 further comprising:

a 24-bit phase-step deletion circuit for receiving said write clock signal to generate a 24-bit phase-step suppression signal for inputting to said elastic buffer and a compensated write clock signal for said phase hopping control circuit whereby said apparatus is provided to implement on an existing network implemented with a 24-bit phase step signal to generate a read clock signal to control a bit-leaking from said elastic buffer.

3. An apparatus for canceling network PAJs of claim 1 wherein said phase hopping control circuit further comprising:

an up-down counter for receiving said leaking rate control signal and said polarity signal for generating an address;

a plurality of delay circuits for receiving said write clock signal for generating a plurality of phase hopping delay signals; and a multiplexer for receiving said phase hopping delay signals and said address from said up-down counter to generate said read clock signal for controlling a data bit output from said elastic buffer.

4. An apparatus for canceling network PAJs of claim 3 wherein:

each of said delay circuits is provided for generating a phase hopping delay signals of approximately equal phase delay; and a sum of said phase delays of said plurality of delay circuits is approximately a total phase of $2\pi$.

5. An apparatus for canceling network PAJs of claim 3 wherein:

said phase hopping control circuit includes N delay circuits, where N is an integer, and each is provided for generating a phase hopping delay signals of approximately a phase delay of $2\pi/N$; and said up-down counter generates a five-bit address for said multiplexer to select one among thirty-two phase delay signals.

6. An apparatus for canceling network pointer adjustment jitters (PAJs), having an elastic buffer to receive, according to a write clock signal, and for temporarily storing a plurality of data bits therein and a pointer interpreter for determining a pointer adjustment event (PAE) and a polarity of bit-stuffing from said data bits, said apparatus comprising:

a leaking rate control signal generator for generating a leaking rate control based on said PAE and a polarity signal based on said polarity of bit stuffing;

a 24-bit phase-step deletion circuit for receiving said write clock signal to generate a 24-bit phase-step suppression signal for inputting to said elastic buffer and a compensated write clock signal for said phase hopping control circuit whereby said apparatus is provided to implement on an existing network implemented with a 24-bit phase step signal to generate a read clock signal to control a bit-leaking from said elastic buffer;

a phase hopping control device for applying said compensated write clock signal, said leaking rate control signal and said polarity signal for performing a phase-hopping read clock adjustment to generate a read clock signal for controlling a bit-leaking from said elastic buffer whereby said bit-leaking is controlled to release in a fraction of a phase step of each bit of said data;

said phase hopping control circuit further includes an up-down counter for receiving said leaking rate control signal and said polarity signal for generating an address;

said phase hopping control circuit further includes a plurality of delay circuits for receiving said compensated write clock signal for generating a plurality of phase hopping delay signals wherein each of said delay circuits is provided for generating a phase hopping delay signals of approximately equal phase delay, and wherein a sum of said phase delays of said plurality of delay circuits is approximately a total phase of $2\pi$; and a multiplexer for receiving said phase hopping delay signals and said address from said up-down counter to generate said read clock signal for controlling a data bit output from said elastic buffer.

7. A method for canceling network pointer adjustment jitters (PAJs) on a network having an elastic buffer to receive, according to a write clock signal, and for temporarily storing a plurality of data bits therein and a pointer interpreter for determining a pointer adjustment event (PAE) and a polarity of bit-stuffing from said data bits, said method comprising the steps of:

(a) generating a leaking rate control signal by employing a leaking rate control signal generator based on said PAE and a polarity signal based on said polarity of bit stuffing; and (b) employing a phase hopping control device for applying said write clock signal, said leaking rate control signal and said polarity signal for performing a phase-hopping read clock adjustment to generate a read clock signal for controlling a bit-leaking from said elastic buffer whereby said bit-leaking is controlled to release in a fraction of a phase step of each bit of said data.

8. The method for canceling network PAJs on a network of claim 7 further comprising a step of:

(c) employing a phase-step deletion circuit for receiving said write clock signal to generate a 24-bit phase-step suppression signal for inputting to said elastic buffer and a compensated write clock signal for said phase hopping control circuit whereby said method is provided to implement on an existing network implemented with a 24-bit phase step signal to generate a read clock signal to control a bit-leaking from said elastic buffer.

9. The method for canceling network PAJs on a network of claim 7 wherein said step (b) of employing a phase hopping control device for performing a phase-hopping read clock adjustment to generate a read clock signal further comprising a step of:

(b1) employing an up-down counter for receiving said leaking rate control signal and said polarity signal for generating an address;

(b2) employing a plurality of delay circuits for receiving said write clock signal for generating a plurality of phase hopping delay signals; and (b3) employing a multiplexer for receiving said phase hopping delay signals and said address from said up-down counter to generate said read clock signal for controlling a data bit output from said elastic buffer.

10. The method for canceling network PAJs on a network of claim 9 wherein said step (b2) of employing a plurality of delay circuits for generating a plurality of phase hopping delay signals further comprising a step of:

(b1-1) employing a plurality of delay circuits wherein each of said delay circuits is provided for generating a phase hopping delay signals of approximately equal phase delay; and (b2-2) employing a plurality of delay circuit wherein a sum of said phase delays of said plurality of delay circuits is approximately a total phase of $2\pi$.

11. A method for canceling network pointer adjustment jitters (PAJs) on a network having an elastic buffer to receive, according to a write clock signal, and for temporarily storing a plurality of data bits therein and a pointer interpreter for determining a pointer adjustment event (PAE) and a polarity of bit-stuffing from said data bits, said method comprising the steps of:

(a) generating a leaking rate control signal by employing a leaking rate control signal generator based on said PAE and a polarity signal based on said polarity of bit stuffing; and (b) employing a phase hopping control device for applying a compensated write clock signal, said leaking rate control signal and said polarity signal for performing a phase-hopping read clock adjustment to generate a read clock signal for controlling a bit-leaking from said elastic buffer (c) employing an up-down counter for receiving said leaking rate control signal and said polarity signal for generating an address;

(d) employing a plurality of delay circuits for receiving said compensated write clock signal for generating a plurality of phase hopping delay signals wherein each of said delay circuits is provided for generating a phase hopping delay signals of approximately equal phase delay and wherein a sum of said phase delays of said plurality of delay circuits is approximately a total phase of $2\pi$;

(e) employing a multiplexer for receiving said phase hopping delay signals and said address from said up-down counter to generate said read clock signal for controlling a data bit output from said elastic buffer whereby said bit-leaking is controlled to release in a fraction of a phase step of each bit of said data; and (f) employing a phase-step deletion circuit for receiving said write clock signal to generate a 24-bit phase-step suppression signal for inputting to said elastic buffer and said compensated write clock signal for said phase hopping control circuit whereby said method is provided to implement on an existing network implemented with a 24-bit phase step signal to generate a read clock signal to control a bit-leaking from said elastic buffer.

\* \* \* \* \*